(12) United States Patent
Tanaka

(10) Patent No.: US 7,387,436 B2
(45) Date of Patent: Jun. 17, 2008

(54) EAR-TYPE CLINICAL THERMOMETER

(75) Inventor: Hideki Tanaka, Sapporo (JP)

(73) Assignee: Kabushiki Kaisha Bio Echo Net, Sapporo (JP)

( * ) Notice: Subject to any disclaimer, the term of this patent is extended or adjusted under 35 U.S.C. 154(b) by 79 days.

(21) Appl. No.: 11/375,497

(22) Filed: Mar. 13, 2006

(65) Prior Publication Data

US 2007/0091980 A1    Apr. 26, 2007

(30) Foreign Application Priority Data

Oct. 21, 2005    (JP)    ............................. 2005-307672

(51) Int. Cl.
*G01J 5/00*    (2006.01)
*G01K 1/00*    (2006.01)

(52) U.S. Cl. .................... 374/121; 374/120; 374/100; 374/208

(58) Field of Classification Search ................ 374/121, 374/120, 208, 100; D10/57
See application file for complete search history.

(56) References Cited

U.S. PATENT DOCUMENTS

| | | | |
|---|---|---|---|
| 3,581,570 A | | 6/1971 | Wortz |
| 4,854,730 A | * | 8/1989 | Fraden ...................... 374/164 |
| 5,017,018 A | * | 5/1991 | Iuchi et al. .................. 374/130 |
| 5,368,038 A | * | 11/1994 | Fraden ....................... 600/474 |
| 6,129,673 A | | 10/2000 | Fraden |
| 6,898,457 B1 | * | 5/2005 | Kraus et al. ................. 600/474 |
| 2005/0209516 A1 | * | 9/2005 | Fraden ....................... 600/323 |

OTHER PUBLICATIONS

"Our Technology", Article published on Website of Ishizuka Electronics Corporation (and translation thereof), from the feature article named "High technology of sensor" in Dempa-Shimburn on May 12, 2005.

* cited by examiner

*Primary Examiner*—Gail Verbitsky
*Assistant Examiner*—Megann E Vaughn
(74) *Attorney, Agent, or Firm*—DeLio & Peterson, LLC

(57) ABSTRACT

A probe includes, a substantially L-shaped cylindrical probe body coupled through a cable to a measuring device and a temperature measuring section connected to the probe body. The temperature measuring section includes a flange portion connected to the probe body and an end portion extending from the flange portion and mounting a sensor mirror in the interior. The sensor mirror includes a cylindrical holder having a concave reflection surface in the interior, a coupling shaft extending from the cylindrical holder, a first sensor for measurement and a second sensor for correction supported in a front space of the cylindrical holder by lead wires, respectively, and a cover sheathing a front surface of the cylindrical holder. The respective lead wires supporting the first and second sensors pass the temperature measuring section and probe body and are electrically connected to the cable.

4 Claims, 18 Drawing Sheets

EAR-TYPE CLINICAL THERMOMETER

BACKGROUND OF THE INVENTION

This invention generally relates to a thermometer that measures a body temperature of an object to be measured and more particularly relates to a clinical thermometer that measures a temperature of an eardrum by inserting a temperature measuring section into an ear.

For convenience of explanation, a typical conventional ear-type clinical thermometer will be described below by referring to FIGS. 17 and 18. FIG. 17 is a schematic block diagram of a conventional ear-type clinical temperature, illustrating a principle of operation. FIG. 18 is a longitudinal section view of an end portion of a temperature measuring section in a conventional ear-type clinical thermometer. As shown in FIG. 17, a probe 10 of a typical conventional ear-type clinical thermometer utilizes a thermopile 11. In general, a thermopile creates an electric potential difference (Seebeck effect) by a difference of temperature between a cold junction and a hot junction on the thermopile. In order to utilize the thermopile as a probe for measuring a temperature, it is necessary to effect a compensation of a room temperature (an environmental temperature), as is the case with a thermocouple. Thus, the conventional ear-type clinical thermometer has used a thermistor 12.

When a temperature in an object being measured is equal to a temperature in a cold junction on the thermopile 11, an output from the probe 10 is zero (zero point). On the other hand, when a temperature in an object being measured is higher than a temperature in a cold junction on the thermopile 11, an output from the probe 10 becomes great nonlinearly.

In the case where the probe 10 measures a body temperature, an output from the probe 10 is a very feeble level. Consequently, a signal amplifier 13 amplifies the output from the probe 10 to a level to which a signal processing can be applied. A linearizer 14a linearizes the nonlinear output. On the other hand, since an output from the thermistor 12 is nonlinear, a linearizer 14b linearizes the output from the thermistor 12.

Under a stable condition of an environmental temperature, a temperature in the thermistor 12 is equal to a temperature in a cold junction on the thermopile 11. A signal linearized from the output of the probe 10 indicates a difference between the temperatures in the thermistor 12 and in the object being measured. Accordingly, it is possible to obtain the temperature of the object being measured by correcting the environmental temperature by a temperature conversion device 17 after correcting the signal linearized from the output of the probe 10 by an emittance correction device 15 and effecting a compensation of room temperature or a compensation of cold junction temperature of the corrected signal and the linearized signal from the thermistor 12 by an adding device 16. This will be displayed on a display 18.

Since the thermopile has an unstable sensitivity in individual differences, the output voltage is unstable, even if there is a certain difference of temperature. Thus, it is necessary to individually effect an adjustment of sensitivity (correcting operation) for a probe using a thermopile. Although an infrared absorption membrane for the thermopile (a portion 116 integrated with the infrared absorption membrane and hot junction in FIG. 18) increases a temperature by absorption of infrared rays from the object to be measured, a package of the thermopile radiates infrared rays onto the infrared absorption membrane. In a common using method, the package is deemed to be at the same as the temperature of a heat sink (heat absorption section) in the thermopile. However, when the package is subject to an abrupt change of temperature due to an external factor, a difference of temperature will be caused between a head portion of the package and the heat sink of the thermopile and the probe will be unstable transiently.

Consequently, in order to apply a uniform and moderate change of temperature to the probe 10, as shown in FIG. 18, a thermopile 110 is disposed in a holder 111 made of a metal having a good heat conduction (for example, aluminum) and the holder 111 is sheathed by a cover 114 so as to enclose the thermopile 110 by an air layer 112 and a resin 113 that serve as a heat insulation material. A metal tube 115 is provided on a front side of the thermopile 110 to reduce affection of heat radiation from the object being measured. The metal tube 115 is plated with gold to reduce an emittance as low as possible and to serve as a wave-guide. Although a semiconductor, a thermistor, or the like is usually utilized as a sensor for compensating a temperature of the cold junction, the thermistor has been commonly used on account of a low cost in production and a high precision.

In the case where a heat coupling between the cold junction on the thermopile and the thermistor is poor, a difference of temperature is caused and it is impossible to effect a precise measurement. A thermistor (not shown) is mounted in a package together with the thermopile to enhance a heat coupling between a heat sink of the thermopile cold junction and the thermistor. Since a B constant (resistant temperature characteristics, that is, a constant for indicating a change of a resistance value obtained from temperatures at any two points) is unstable even if any thermistors have the same standard, it is difficult to maintain a precision within a wide range of environmental temperature. For example, in the case where a thermistor in an electronic clinical thermometer measures a body temperature within a range of 34 to 42° C., a precision of the thermistor may be maintained within a range of 8° C. However, in the case where a range of environmental temperature in the thermopile is set to be within a range of 5 to 40° C., a precision of the thermistor must be maintained within a range of 35° C. (40−5=35).

A structure of the probe 10 shown in FIG. 18 causes a difference of temperature between the thermopile 110 and a distal end of the probe 10 for increase of the environmental temperature. The probe 10 will generate a positive error, since a temperature at the temperature measuring section is higher than that of the thermopile 110. The probe 10 causes a difference of temperature between the thermopile 110 and the distal end of the sensor during decrease of the environmental temperature. The probe 10 will generate a negative error, since a temperature at the temperature measuring section is lower than that of the thermopile 110. In order to reduce such errors, the cover 114 encloses the thermopile 110 to lower affection of a temperature change. However, an oversize of the metal holder 111 is limited on account of the object being measured. A countermeasure against the errors due to the change of environmental temperature takes a correction of an output of the probe by calculating a rate of change per time concerning the thermistor in the thermopile package, thereby reducing the errors.

Under the circumstances, the present applicant has proposed in the previous Patent Application (Japanese Patent Application No. 2005-071350) an ear-type clinical thermometer that can eliminate affection due to a change of environmental temperature for a short period of time and does not generate an error due to a change of environmental temperature.

The ear-type clinical thermometer in the above Patent Application comprises: a first heat insulation member made of a resin material; a second high heat insulation member made of a resin material that is connected to a distal end of the first heat insulation member; a protection cover that sheathes the first heat insulation member and second high heat insulation member; a thermistor fine lead wire embedded in the first heat insulation member and second high heat insulation member; and an ultrafast responsivity thermistor mounted substantially on a center of a turning end portion of the thermistor fine lead wire.

According to the invention of the above Patent Application, a range of temperature at which the thermistor can maintain a precision is only a range of a body temperature to be measured and it is not necessary to maintain a precision of the thermistor in a whole range of an environmental temperature to be measured, as is the case with a conventional ear-type clinical thermometer using the thermopile. Consequently, the probe of the invention of the above Patent Application is not subject to affection of change of environmental temperature (change of temperature for a short period of time).

In the ear-type clinical thermometer, there are following problems. That is, it is difficult to form a structure in which a sensor itself is inserted into the external acoustic meatus, since it is difficult to downsize a thermopile sensor. In the case where a distance between a sensor and a probe is relatively great, a sub frame is upsized and thus the probe is also upsized (see FIG. 18). This is not suitable for a continuous measurement type probe.

Although a conventional ear-type clinical thermometer is suitable for measurement of a body temperature at a one step for a short period of time, it is not suitable for continuous measurement of the body temperature for a long period of time. An ear-type clinical thermometer that has become widespread at the present is expensive and unsuitable under the special condition of use. For example, under measurement condition of a body temperature for a person in a surgical operation, a relatively long raise time (about ten minutes or so) can be negligible since a preparing step before the surgical operation can take a sufficient time. A great relative temperature and a fast change of temperature can be negligible (it will be better to detect a change of temperature of 1° C. at the maximum for ten minutes). The body temperature should be continuously measured. An environmental temperature is relatively stable.

Accordingly, a first object of the present invention is to provide an ear-type clinical thermometer that can measure a body temperature of an object being measured continuously for a long period of time and is inexpensive and disposable.

When the ear-type clinical thermometer is mounted in an external acoustic meatus in an object being measured, the thermometer may be often displaced or detached by an external force from a connecting cord. In this case, precise measurement of a body temperature cannot be effected.

A second object of the present invention is to provide an ear-type clinical thermometer that can be mounted firmly and steadily in an external acoustic meatus of an object being measured.

In a common ear-type clinical thermometer, a correcting operation will raise a cost of a product. A third object of the present invention is to provide an ear-type clinical thermometer that can significantly simplify a correcting operation.

SUMMARY OF THE INVENTION

In order to accomplish the above objects, an ear-type clinical thermometer in accordance with the present invention is provided with a probe to be coupled to a measuring device. The probe includes a probe body and a temperature measuring section connected to the probe body. The probe body is formed into a substantially L-shaped cylindrical member. An end of the probe body is coupled to the measuring device through a cable while the other end of the probe body is connected to the temperature measuring section. The temperature measuring section includes a flange portion connected to the probe body and a distal end portion extending from the flange portion. A sensor mirror is fitted in the interior of the distal end portion. The sensor mirror includes a cylindrical holder having a concave reflection surface in the interior, a coupling shaft extending from the rear side of the cylindrical holder, a first sensor for measurement and a second sensor for correction supported in a front space of the cylindrical holder by lead wires, respectively, and a cover sheathing a front surface of the cylindrical holder. The lead wires supporting the first and second sensors pass the temperature measuring section and probe body and are electrically connected to the cable. The probe may be disposable every step of use.

It should be noted that the words "front side" described herein define a side of the object being measured and the words "rear side" define a side of the measuring device. These definitions will be applied to the words described hereinafter by the same manner.

The probe body formed into the L-shaped cylindrical member has a long side portion and a bent short side portion. A contour of the probe body is formed so that the long side portion extends near a lower part of an ear of an object being measured and the bent short side portion is directed to the ear hole. The distal end portion of the temperature measuring section extends in a substantially serpentine S-shaped path along an external acoustic meatus of the object being measured from a flange portion. This configuration serves to prevent the probe from falling down from the ear or being shifted in the ear hole. Preferably, the probe body and temperature measuring section may be made of heat insulation materials and the outer surface of the temperature measuring section may be covered with an antiallergic material.

The distal end portion inclines at a given angle θ 1 with respect to a centerline of the flange portion at a position shifted from the center of the flange portion. The flange portion of the temperature measuring section includes a bottom surface connected to the probe body and a top surface continued to the distal end portion. The top surface inclines by a given angle θ 2 with respect to the bottom surface.

The first sensor mirror is a parallel light collector type mirror including a relatively short cylindrical holder having a concave reflection surface therein, a coupling shaft extending from a rear side of the cylindrical holder, first and second sensors supported by individual lead wires at the front side of the cylindrical holder, and a protection cover sheathing the front side of the cylindrical holder.

The second sensor mirror is a point-source light collector type sensor mirror including a relatively long cylindrical holder having a concave reflection surface therein, a coupling shaft extending from a rear side of the cylindrical holder, first and second sensors supported by individual lead wires at the front side of the cylindrical holder, and a protection cover sheathing the front side of the cylindrical holder. Preferably, the concave reflection surface of the cylindrical holder is left as it is, or is applied with a mirror-finished treatment or with a metal foil treatment or a nickel-plated treatment. Preferably, the cylindrical holder may be provided on the front and rear ends with notches to guide the lead wires from the front side of the temperature measuring section to the rear side of the probe body. Preferably, the coupling shaft may be provided longitudinally with a plurality of V-shaped grooves. Preferably, a coupling base plate may be embedded in an end of the probe body, the lead wire extending from each of the sensors may be connected to the end of the coupling base plate, and the cable may be connected to the other end of the coupling base plate. Preferably, the protection cover sheathing the front side of the cylindrical holder may be made of a polyethylene film.

Each of the first and second sensors includes a thin film thermistor deposited on a ceramic base plate, electrodes attached to the opposite ends of the thin film thermistor, lead wires soldered on the electrodes, and resin materials applied to the whole top surface of the sensors. Preferably, the first sensor may be applied with a resin material having high radiation and good absorption characteristics of infrared rays and the second sensor may be applied with a resin material having characteristics resistant to absorption of infrared rays (for example, two-part hardened epoxy resin). The difference of indication (difference of temperature) between the first and second sensors will present strength of infrared rays radiating on the sensors. It is possible to define the first and second sensors and the concave reflection surface portion as an infrared sensor.

In the ear-type clinical thermometer according to the present invention, it is not necessary to keep a precision of a thermistor all over the range of environmental temperatures to be measured, even though the conventional ear-type clinical thermometer using the thermopile had to keep the precision all over the range, since a range of temperatures in which the thermistor used in the probe need to keep a precision is within only a range of change of a body temperature in the object being measured. Under a relatively stable environmental temperature, the ear-type clinical thermometer according to the present invention can measure the body temperature continuously for a long period of time. The present invention can simplify a temperature measuring circuit and correction of temperature, can downsize a probe, can facilitate an assembling process in a mass production, and can obtain a small, inexpensive ear-type clinical thermometer. Accordingly, since the ear-type clinical thermometer according to the present invention is disposable and can be firmly and steadily mounted in an ear of an object being measured, it is most suitable for measuring a body temperature in a person particularly under a surgical operation.

BRIEF DESCRIPTION OF THE DRAWINGS

The features of the present invention believed to be novel and the element characteristic of the present invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 10C is a front elevation view taken from the right side of FIG. 10B, and FIG. 10D is a rear elevation view taken from the left side of FIG. 10B;

DETAILED DESCRIPTION OF THE PREFERRED EMBODIMENTS

Figure 1:
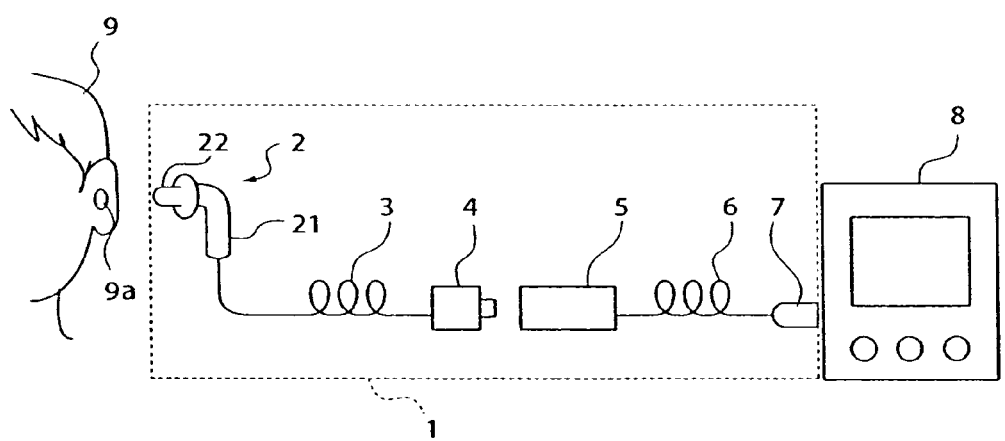
FIG. 1 is a schematic explanatory view of a measuring device provided with an ear-type clinical thermometer in accordance with the present invention.

In describing the preferred embodiment of the present invention, reference will be made herein to FIGS. 1 to 16 of the drawings in which like numerals refer to like features of the invention. Features of the invention are not necessarily shown to scale in the drawings.

Figure 2:
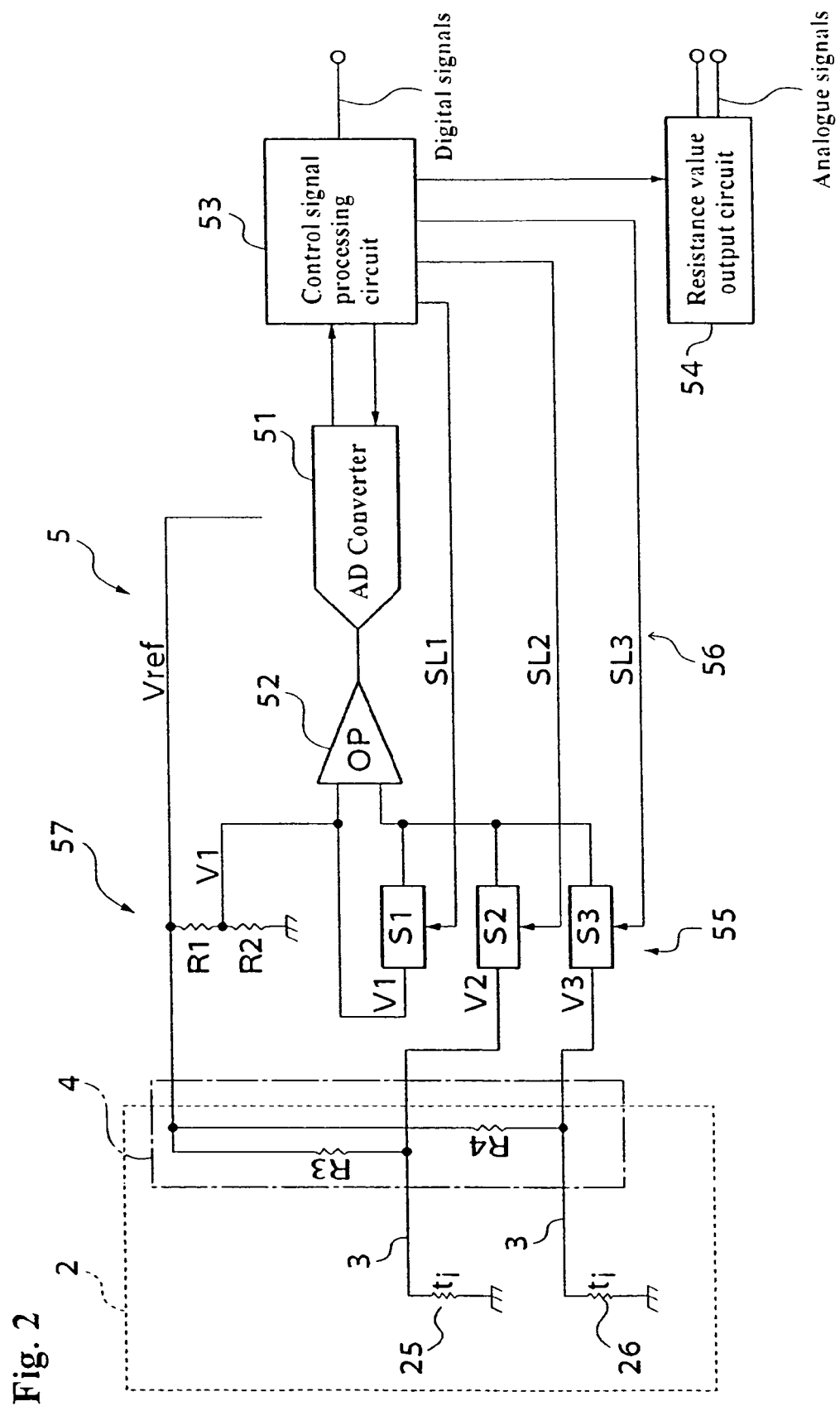
FIG. 2 is a schematic block diagram of the measuring device shown in FIG. 1.
Figure 3:
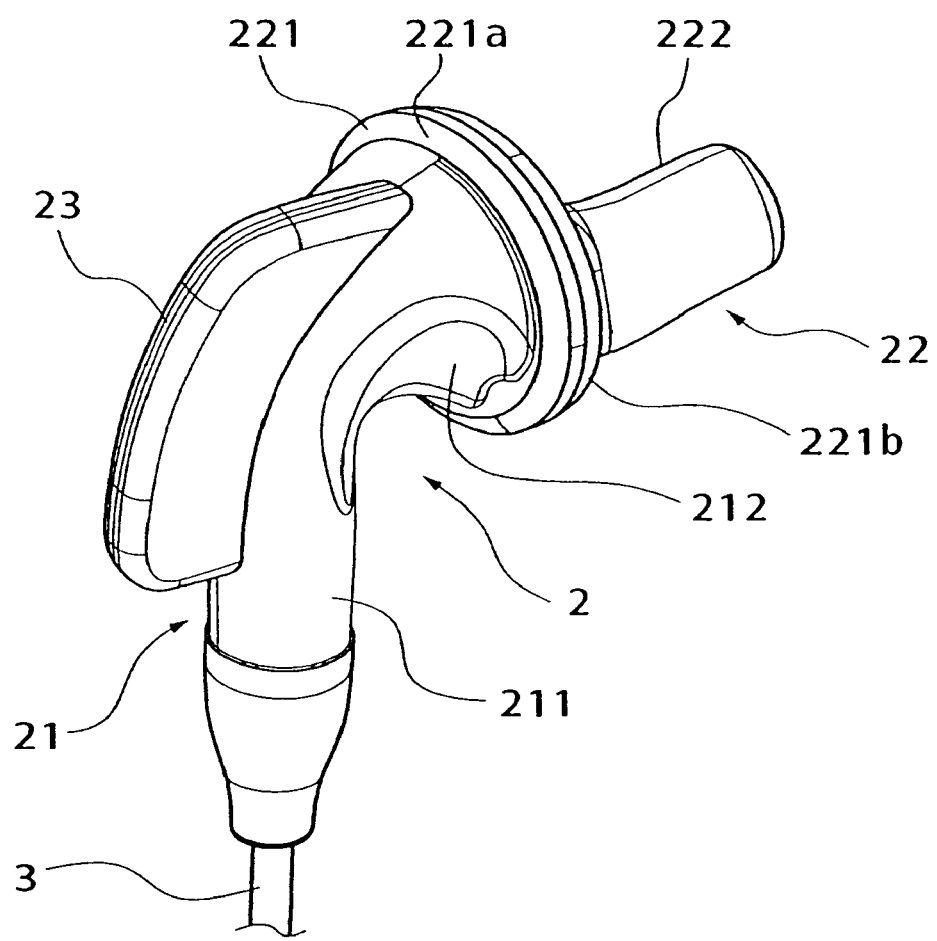
FIG. 3 is a perspective view of the ear-type clinical thermometer according to the present invention.

Referring now to FIGS. 1 to 16, embodiments of an ear-type clinical thermometer in accordance with the present invention will be explained below. FIG. 1 is a schematic explanatory view of a measuring device provided with an ear-type clinical thermometer in accordance with the present invention. FIG. 2 is a schematic block diagram of the measuring device shown in FIG. 1. As shown in FIG. 1, an ear-type clinical thermometer 1 in accordance with the present invention comprises a probe 2, a cable 3, a probe connector 4, a measuring device 5, and a cable 6. An end of the cable 3 is connected to a probe body 21 (see FIG. 3) of the probe 2 while the other end of the cable 3 is connected to the probe connector 4. The probe connector 4 is detachably coupled to the measuring device 5. An end of the cable 6 is connected to the measuring device 5 while the other end of the cable 6 is connected to a temperature plug 7. The temperature plug 7 is detachably coupled to a display device 8.

Figure 15:
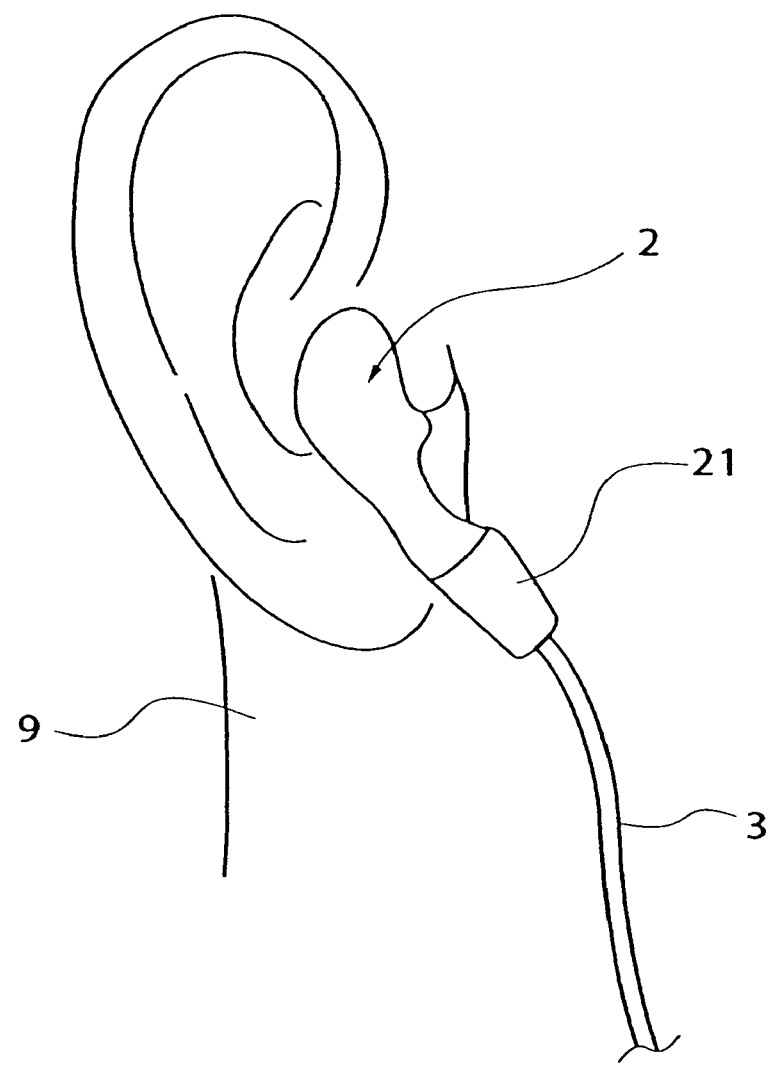
FIG. 15 is a perspective view of the probe in the ear-type clinical thermometer according to the present invention, illustrating the probe mounted on an ear of an object being measured.
Figure 16:
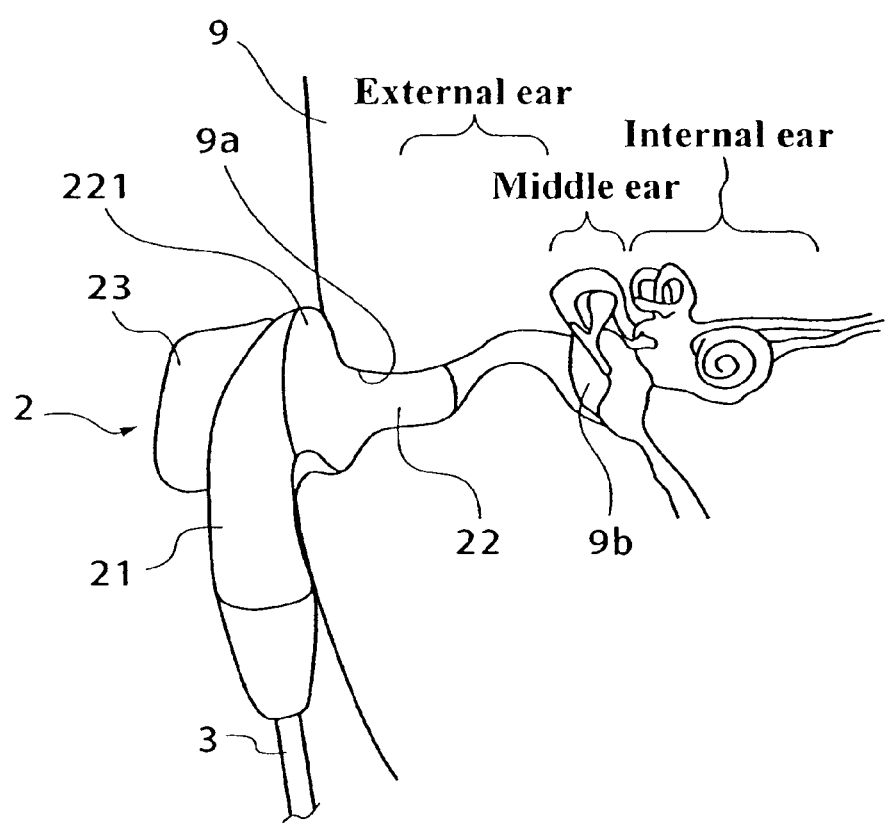
FIG. 16 is an explanatory view of the probe in the ear-type clinical thermometer according to the present invention, illustrating the probe mounted in an ear hole of an object being measured.
Figure 17:
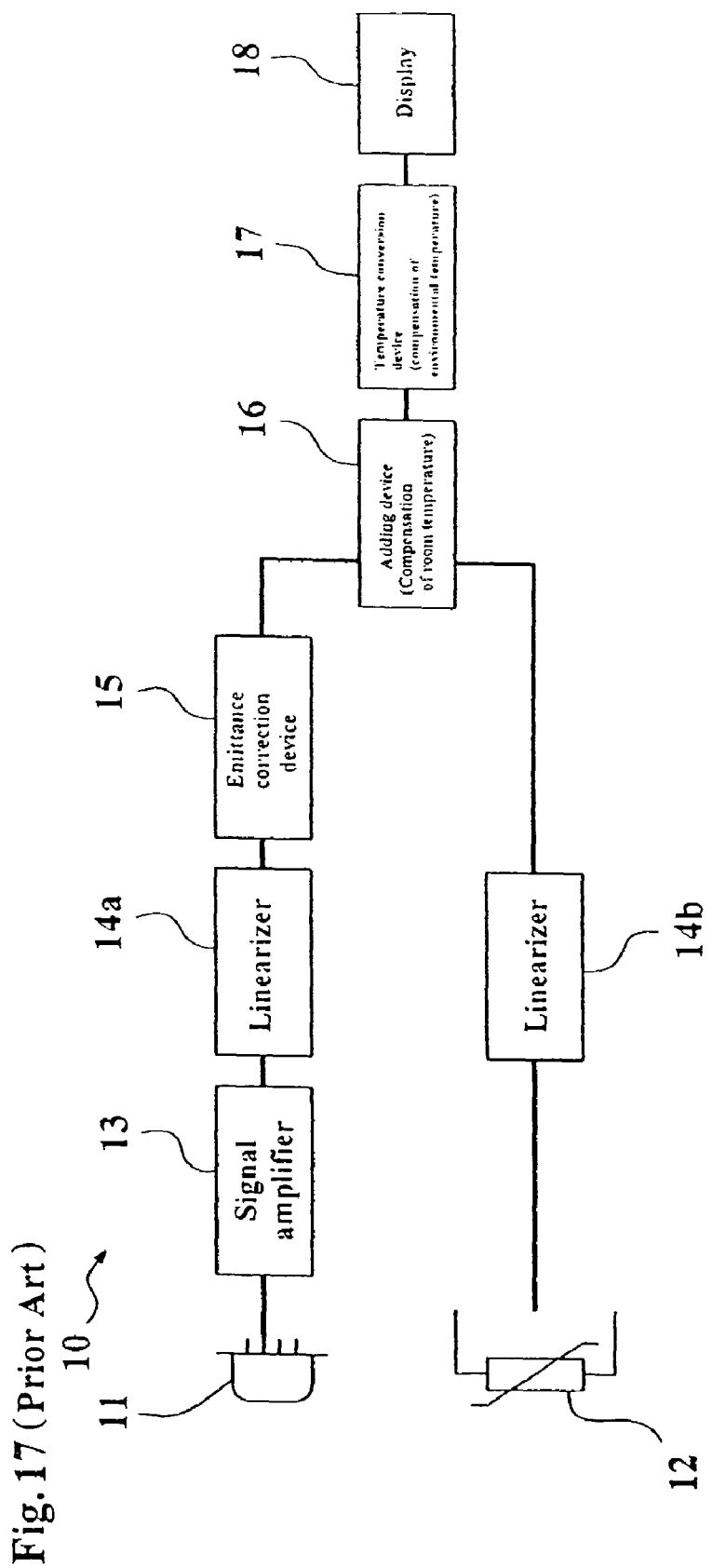
FIG. 17 is a schematic block diagram of a conventional ear-type clinical thermometer, illustrating a principle of operation of the thermometer.
Figure 18:
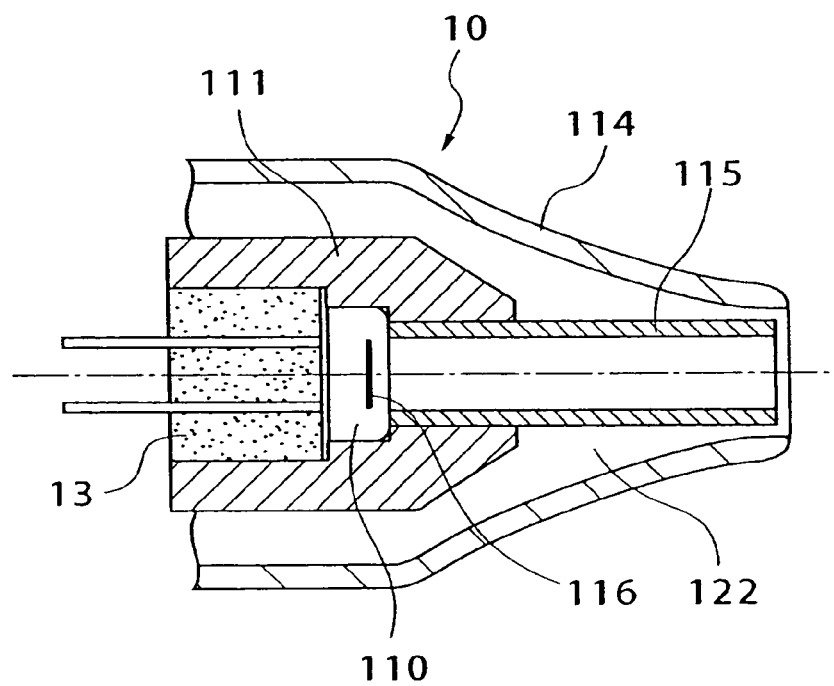
FIG. 18 is a longitudinal section view of a temperature measuring section in a conventional ear-type clinical thermometer.

A temperature measuring section 22 (see FIG. 3) of the probe 2 is mounted in an ear hole 9a of an object being measured 9, as shown in FIGS. 15 and 16.

Referring now to FIG. 2, a schematic construction of the measuring device 5 will be described below. The measuring device 5 mainly includes an AD converter 51, a differential amplifier 52, a control signal processing circuit 53, a resistance value output circuit 54, a switch group 55 (switches S1, S2, S3), a switching line group 56 (SL1, SL2, SL3), and a resistor group 57 (R1, R2, R3, R4).

The probe 2 is coupled to the measuring device 5 through the cable 3 and probe connector 4. The probe 2 includes a first sensor 25 and a second sensor 26 discussed later. The sensors 25 and 26 comprise thermistors described hereinafter. Although the resistors R3 and R4 are disposed in the probe connector 4 in FIG. 2, they may be disposed in the measuring device 5. The probe connector 4 is preferably a conventional card edge type connector (not shown). Individual information such as correction (calibration) values and the like is stored in the card.

Signals detected from the first and second sensors 25 and 26 of the probe 2 are applied to the AD converter 51 and differential amplifier 52. The AD converter 51 is connected to the control signal processing circuit 53 and differential amplifier 52 while the control signal processing circuit 53 is connected to the resistance value output circuit 54. The control signal processing circuit 53 outputs digital signals while the resistance value output circuit 54 generates analogue signals. The control signal processing circuit 53 is connected through the switching line group 56 to the switch group 55. The switch group 55 is connected to the differential amplifier 52.

In order to readily detect feeble temperature difference signals from the first and second sensors 25 and 26, the AD converter 51 preferably has a high precision and resolution characteristic. The resistors R1, R2, R3, and R4 are high precision resistors. A Vref is a reference voltage for the AD converter 51 and a full-scale value for an AD converted value.

A correcting (calibrating) operation by using the measuring device 5 will be described in Example 1 discussed later.

The probe 2 of the ear-type clinical thermometer 1 in accordance with the present invention, as shown in FIGS. 3 to 6, includes the probe body 21, the temperature measuring section 22 coupled to the probe body 21, and a tab 23 provided on the exterior of the probe body 21. The probe body 21 is formed into a substantially L-shaped cylindrical configuration that has a long side portion 211 and a bent short side portion 212. The long side portion 211 extends from a lower part of the ear hole 9a of the object 9 being measured near to a temple on a face while the bent short side portion 212 is connected to a flange portion 221 discussed later. The substantially L-shaped configuration of the probe body 21 serves to direct a distal end portion 222 of the temperature measuring section 22 toward an eardrum 9b in the ear hole 9a of the object 9 being measured and prevent the probe body 21 from falling down from the ear or rotating in the ear hole 9a upon attachment (see FIGS. 15 and 16). The cable 3 extends from a lower end of the probe body 21 and connects lead wires 246 from the first and second sensors 25 and 26 discussed later with the probe connector 4. The tab 23 serves to facilitate an operation of attaching and detaching the probe 2 to and from the ear hole 9a of the object 9 being measured.

Figure 4:
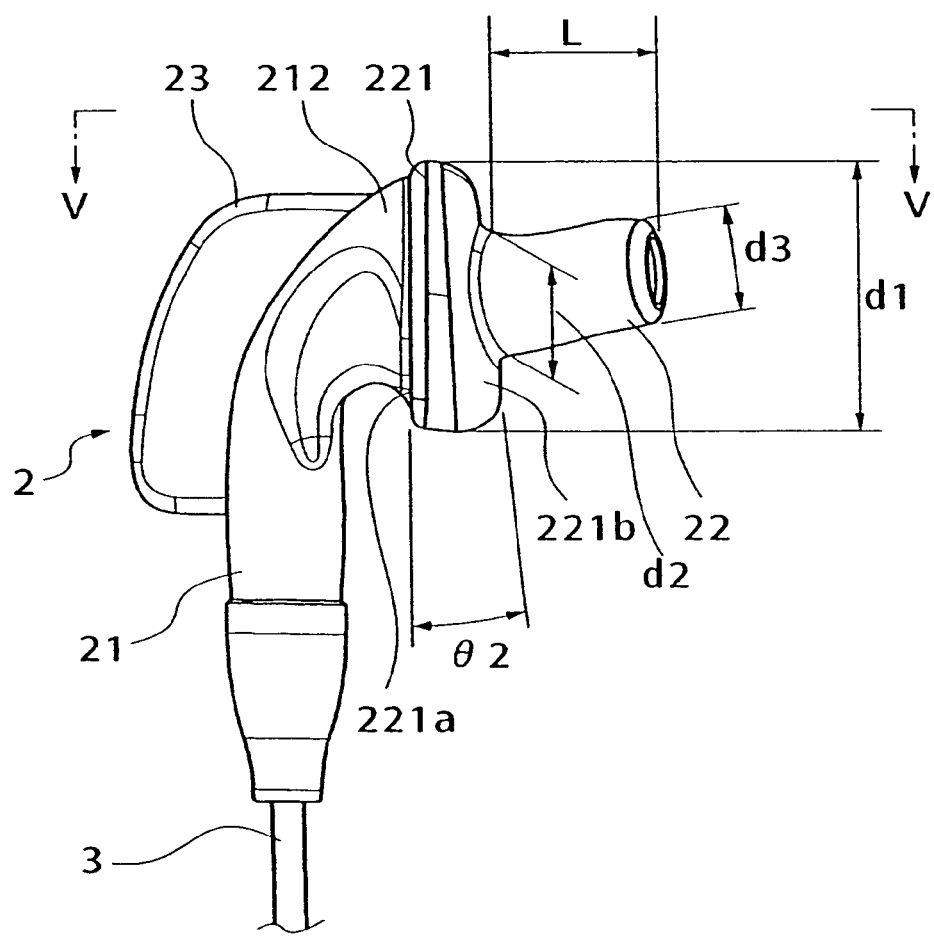
FIG. 4 is a side elevation view of the ear-type clinical thermometer according to the present invention.
Figure 5:
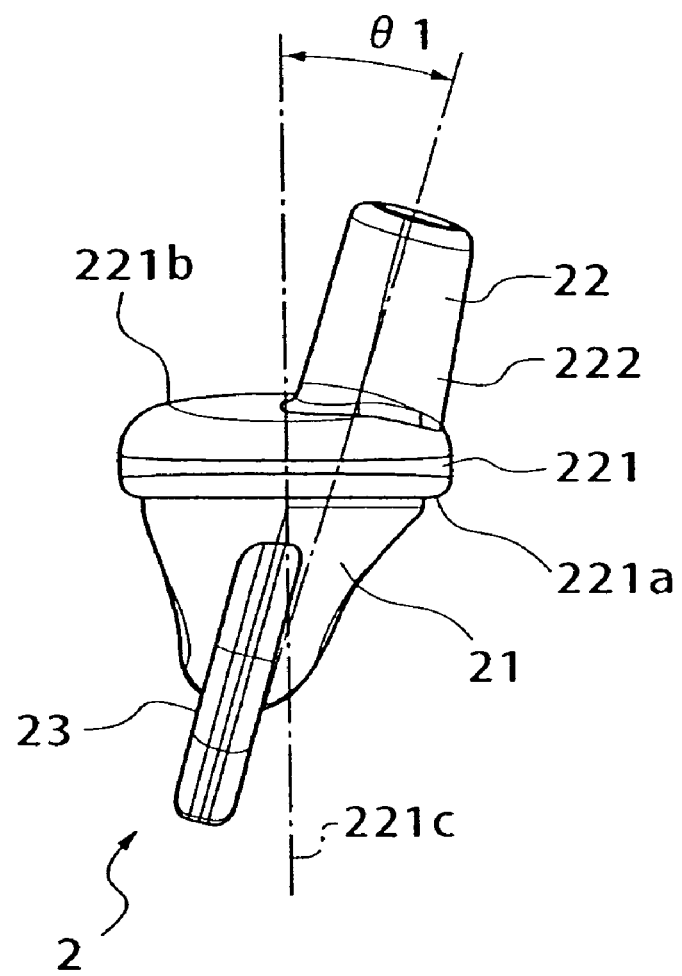
FIG. 5 is a plan view of the ear-type clinical thermometer taken along V-V line in FIG. 4.

The temperature measuring section 22 includes the flange portion 221 joined to the bent short side portion 212 of the probe body 21 and the distal end portion 222 extending from the flange portion 221. As shown in FIG. 16, the flange portion is formed so as to close an inlet of the ear hole 9a and the distal end portion 222 is formed so as to accord with a complex configuration of the external acoustic meatus. In more detail, the distal end portion 222 extends in a substantially serpentine S-shaped path longitudinally (see FIGS. 3 and 6) and inclines at a given angle $\theta$ 1 (about 15 to 20 degrees) with respect to a centerline 221c of the flange portion 221 at a position shifted from the center of the flange portion 221 (see FIG. 5). Furthermore, as shown in FIG. 4, the flange portion 221 of the temperature measuring section 22 includes a bottom surface 221a connected to the probe body 21 and a top surface 221b continued to the distal end portion 222. The top surface 221b inclines by a given angle $\theta$ 2 (about 5 to 10 degrees) with respect to the bottom surface 221a.

The probe body 21, temperature measuring section 22, tab 23, and sensor mirrors 24a and 24b constituting the probe 2 are made of a heat insulation material. Preferably, the temperature measuring section 22 is covered with an elastomer or silicone rubber in consideration of an allergenic reaction.

An example of a relationship in dimension of the probe 2 is described below. As shown in FIG. 4, the distal end portion 222 of the temperature measuring section 22 has a length L of 10 mm, a distal end diameter d3 of 6.5 mm and a proximal end diameter d2 of 7.5 mm and the flange portion 221 has a base portion diameter d1 of 16 to 17 mm. Although there are relatively low individual differences concerning a distance from an inlet of the external acoustic meatus to the eardrum, the length L is set to be 10 mm for safety. A distance from the distal end of the probe to the eardrum is about 7 to 10 mm. It will be better to set the distal end diameter d3 of the distal end portion 222 as great as possible in view of enhancement of a sensor performance. However, since the distal end portion 222 of the temperature measuring section 22 is disposed near "a second curved passage" in which the external acoustic meatus is greatly changed (see FIG. 16), the distal end diameter d3 is set as great as possible within a range that does not give a pain to the object 9 being measured. The flange portion 221 of the temperature measuring section 22 determines stability upon attachment. Accordingly, the proximal end diameter d2 and base portion diameter d1 are set to be greater than the distal end diameter d3 to accord with the inlet of the external acoustic meatus.

The flange portion 221 corresponds to an interior of an external acoustic meatus inlet. Stability upon attachment depends on a size of this portion significantly. Thus, in consideration of a person having a relatively small auricle, the proximal end diameter d1 of the flange portion 221 is set to be 16 to 17 mm and an inclination angle $\theta$ 2 of the top surface 221b with respect to the bottom surface 221a of the flange portion 221 is set to be 5 to 10 degrees. Although an attachment position and inclination angle $\theta$ 1 of the distal end portion 222 with respect to the top surface 221b of the flange portion 221 should be a complex configuration in accordance with a complex configuration of the external acoustic meatus, a typical dimension is adopted, since it is difficult to work the flange portion.

Figure 6:
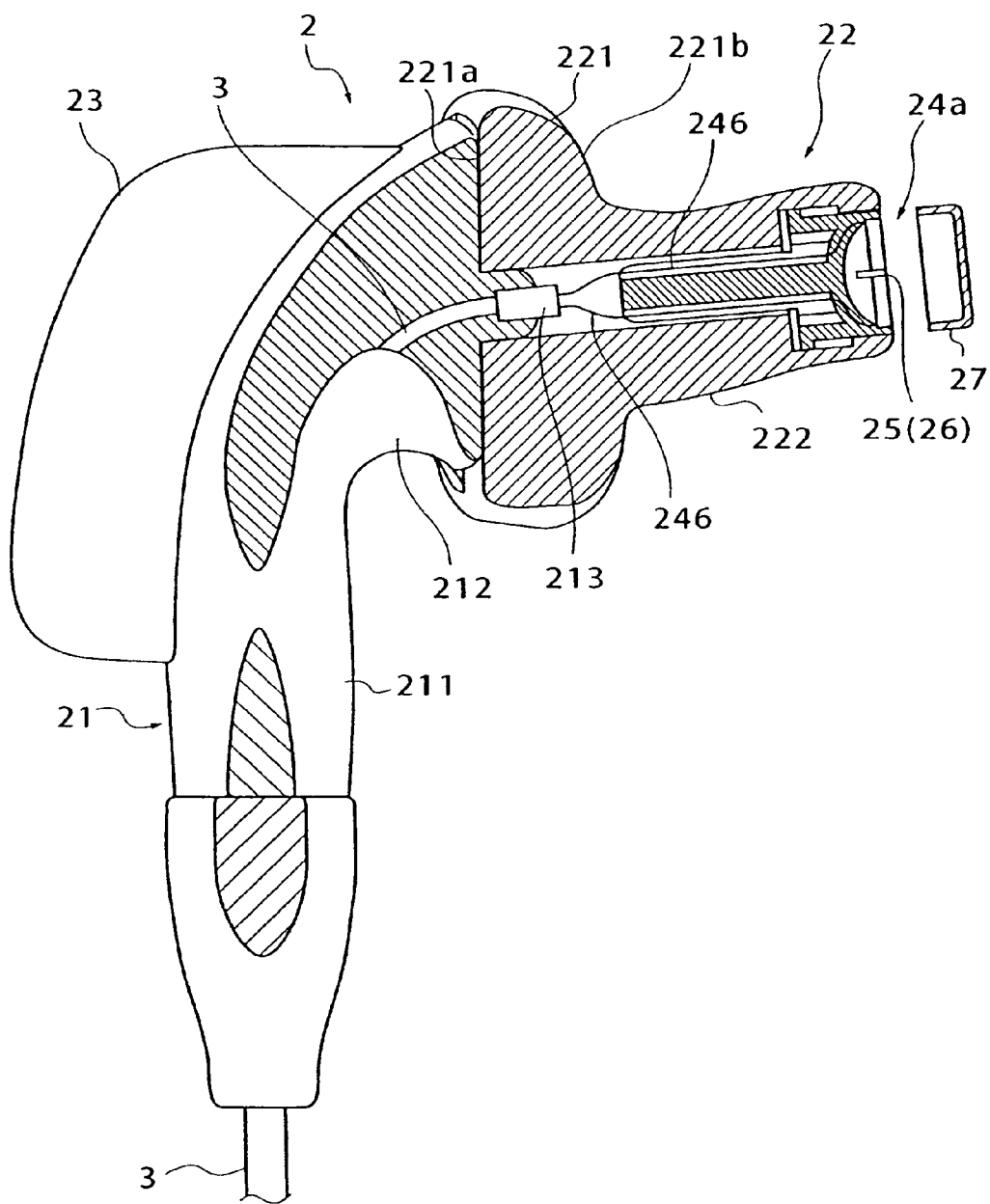
FIG. 6 is a partially broken side elevation view of a probe constituting the ear-type clinical thermometer according to the present invention.
Figure 7:
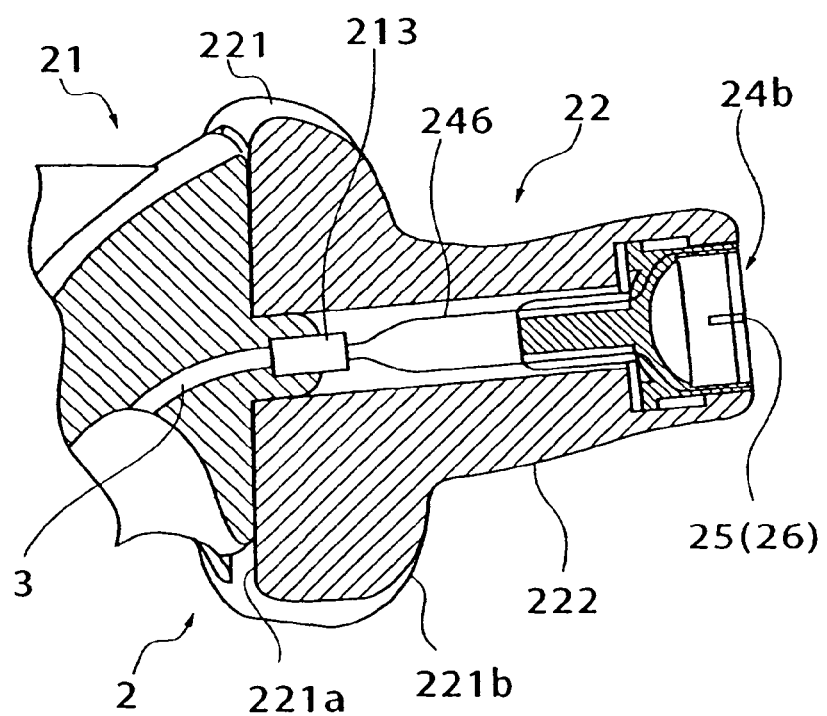
FIG. 7 is a part of a side elevation view similar to FIG. 6, illustrating another embodiment of the probe.

As described above, the probe 2 of the ear-type clinical thermometer 1 according to the present invention includes the probe body 21, temperature measuring section 22, and tab 23. The temperature measuring section 22 includes the flange portion 221 and distal end portion 222. As shown in FIGS. 6 and 7, a first sensor mirror 24a or a second sensor mirror 24b is fitted into the interior of the distal end portion 222 of the temperature measuring section 22. The first sensor mirror 24a is a parallel light collector type mirror shown in FIG. 8. The second sensor mirror 24b is a point-source light collector type mirror shown in FIG. 9. The respective sensor mirrors 24a and 24b are parts different from the temperature measuring section 22 to facilitate a work of assembling the respective sensors 25 and 26.

Figure 8:
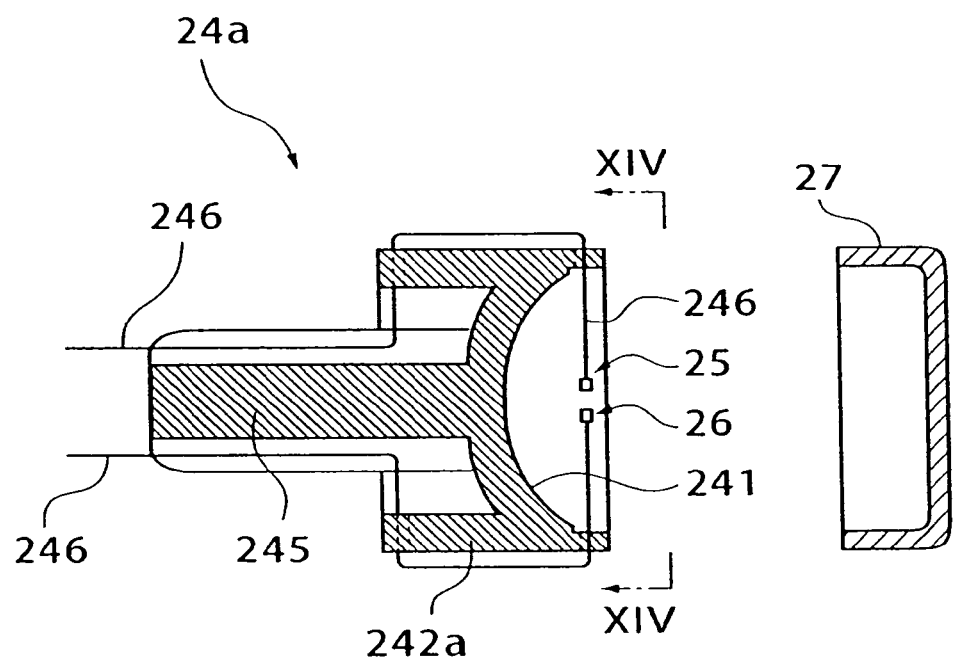
FIG. 8 is a longitudinal section view of a sensor mirror constituting the probe according to the present invention.
Figure 9:
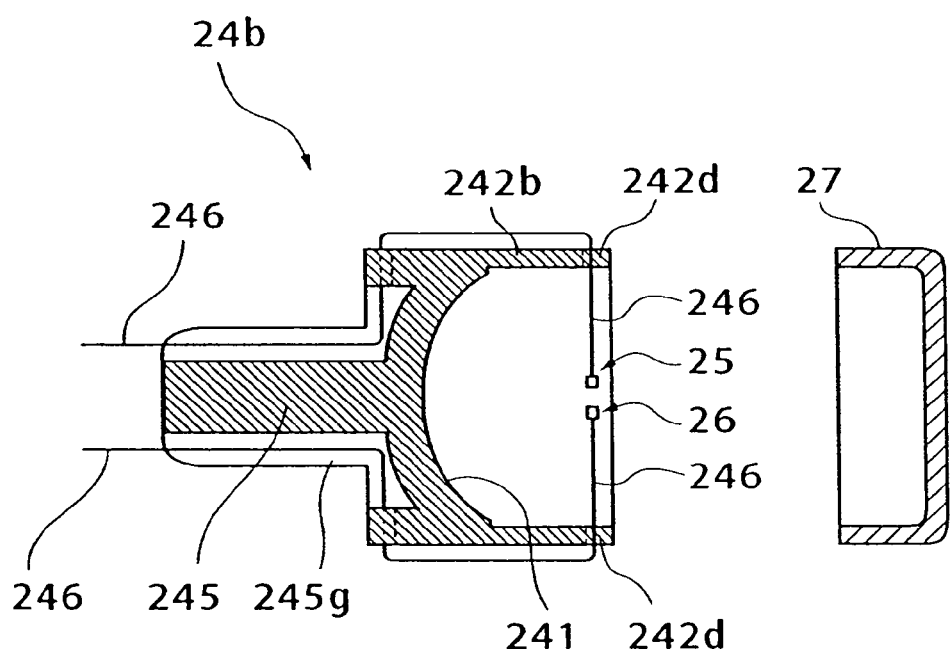
FIG. 9 is a view similar to FIG. 8, illustrating another embodiment of the sensor mirror.
Figure 10A:
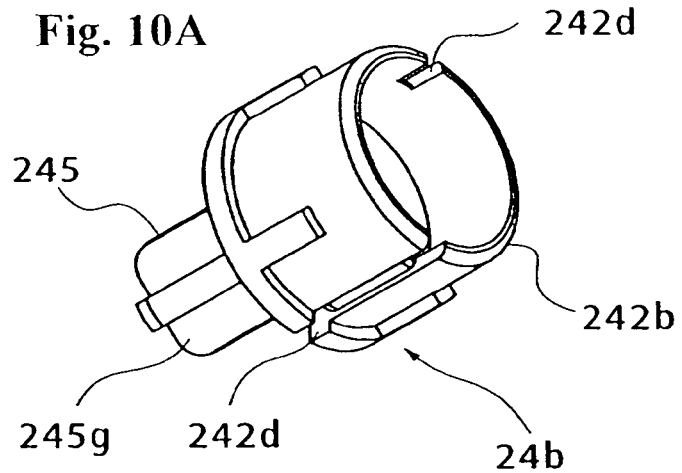
FIGS. 10A to 10D are various kinds of views of the sensor mirror shown in FIG. 9, FIG. 10A being a perspective view, FIG. 10B a side elevation view.
Figure 10B:
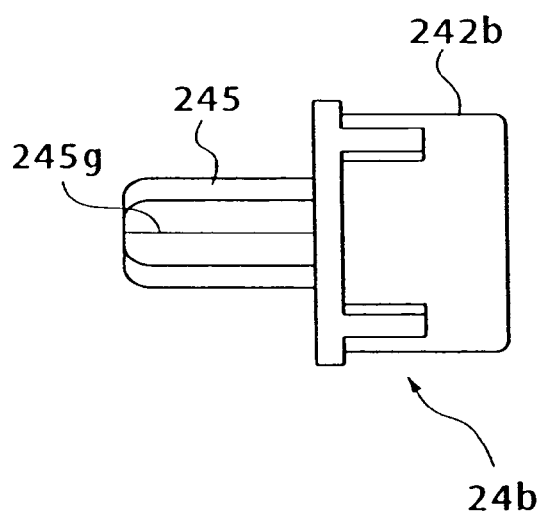
Figure 10C:
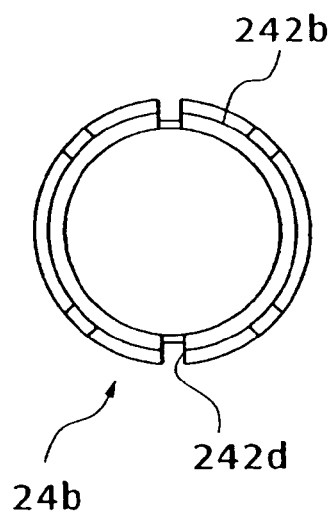
Figure 10D:
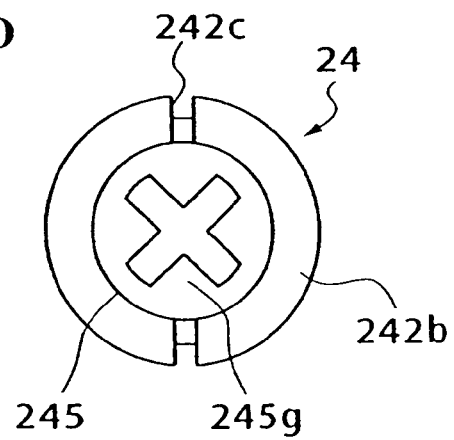

The first sensor mirror (parallel light collector type sensor mirror) 24a, as shown in FIG. 8, includes a relatively short cylindrical holder 242a having a concave reflection surface 241 therein, a coupling shaft 245 extending from a rear side of the holder 242a, the first and second sensors 25 and 26 supported by the lead wires 246 at the front side of the holder 242a (discussed later), a protection cover 27 sheathing the front side of the holder 242a. The second sensor mirror (point-source light collector type sensor mirror) 24b, as shown in FIG. 9, includes a relatively long cylindrical holder 242b having a concave reflection surface 241 therein, a coupling shaft 245 extending from a rear side of the holder 242b, the first and second sensors 25 and 26 supported by the lead wires 246 at the front side of the holder 242b (discussed later), a protection cover 27 sheathing the front side of the holder 242b. The second sensor mirror 24b has substantially the same structure as that of the first sensor mirror 24a. However, they are different from each other with respect to the fact that the cylindrical holder 242b of the second sensor mirror 24b extends forwardly and is longer than the cylindrical holder 242a of the first sensor mirror 24a and that the first and second sensors 25 and 26 of the second sensor mirrors 24b are disposed forwardly in connection of the projecting configuration.

It will be preferable that the reflection surfaces 241 of the sensor mirrors 24a and 24b are left as it is, or are applied with a mirror-finished treatment, or are applied with a metal foil (for example, an aluminium foil) treatment or with a nickel-plated treatment on the respective mirror-finished surfaces.

The first sensor mirror (parallel light collector type mirror) 24a collects the parallel lights at the front side of the cylindrical holder 242a onto the sensors 25 and 26. The second sensor mirror (point-source light collector type mirror) 24b collects the lights from a point light source at an imaginary position for an eardrum. The protection cover 27 is made of any material so long as it can suppress a loss of radiation energy and protect the sensors 25 and 26. For example, the material is preferably a polyethylene film having a thickness of 0.015 mm. The protection cover 27 is secured to the temperature measuring section 22 by pushing a part of the cover 27 into a space between the outer periphery of the cylindrical holder 242a (242b) of the sensor mirror 24a (24b) and an inner periphery of an opening in the distal end portion 222 of the temperature measuring section 22.

FIG. 10 shows a specific structure of the second sensor mirror (point-source light collector type mirror) 24b. The cylindrical holder 242b is provided on the front and rear ends with notches 242d. The coupling shaft 245 is provided longitudinally with four V-shaped grooves 245g. The lead wires 246 connected to the respective sensors 25 and 26 pass the notches 242d and V-shaped grooves 245g and are electrically connected to the cable 3 in the flange portion 221, as discussed later. The same structure can be applied to the first sensor mirror 24a.

As shown in FIGS. 6 and 7, the lead wires 246 extending from the respective sensors 25 and 26 are connected to a coupling base plate 213 embedded in an end of the probe body 21. An end of the cable 3 is connected to the coupling base plate 213.

It has been found from the results of an indication test that outside air temperatures affect an indication of the probe 2. Thus, in order to correct such affection of the outside air temperatures, another sensor (second sensor 26) as well as a sensor for measuring a temperature (first sensor 25) is provided.

Figure 11:
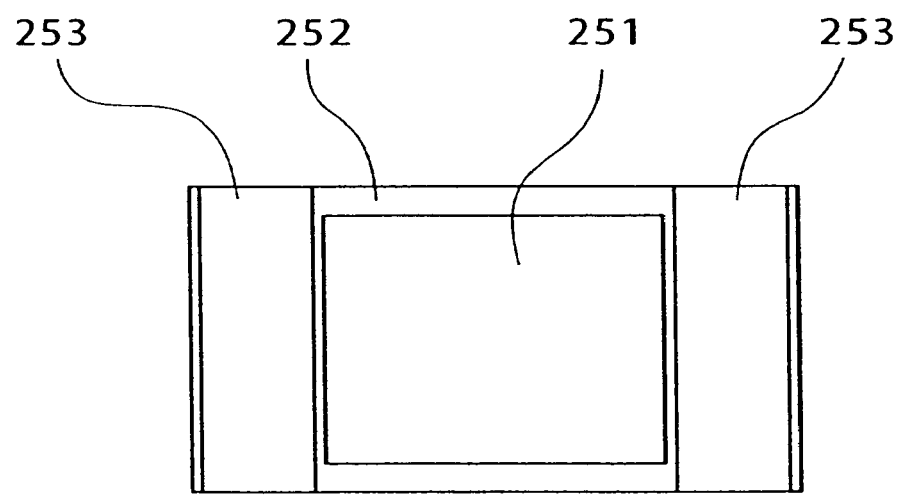
FIG. 11 is a plan view of a sensor constituting the probe according to the present invention.
Figure 12:
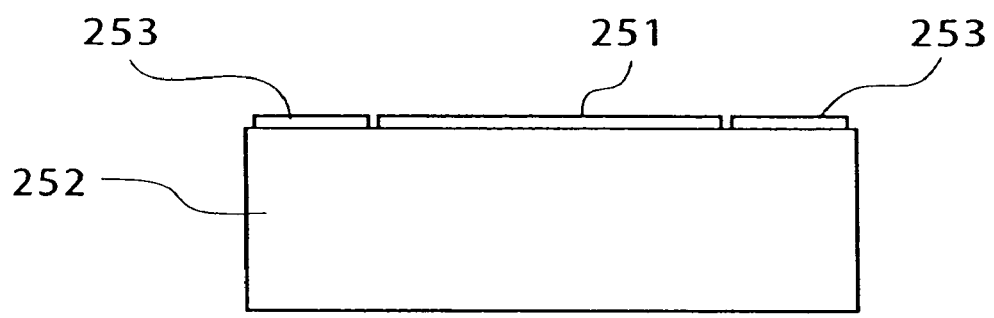
FIG. 12 is a side elevation view of FIG. 11.
Figure 13:
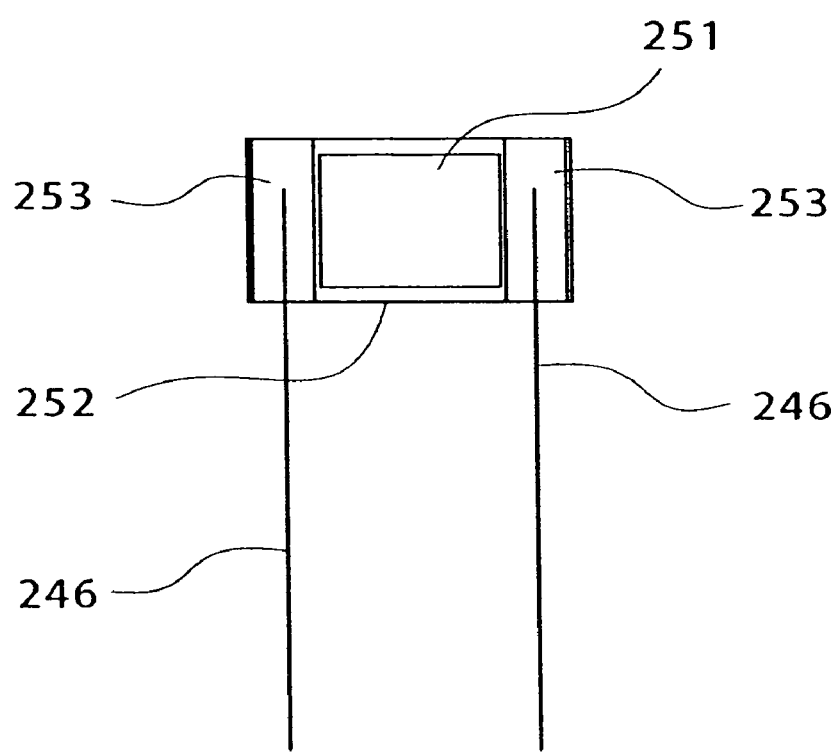
FIG. 13 is a view similar to FIG. 11, illustrating the sensor to which lead wires are secured.

A thermistor element having a small heat capacity, high heat sensitivity, a high responsive temperature increase rate for infrared rays will be suitable for the first and second sensors 25 and 26. For example, a thin film thermistor sold by Ishizukadenshi Kabushikikaisya in Sumidaku, Tokyo will be preferable. This thin film thermistor has dimensions of, for example, 0.4 mm in length, 0.1 mm in width, and 0.2 mm in thickness. As shown in FIGS. 11 to 13, the thin film thermistor 251 is deposited on a ceramic base plate 252 (for example, 0.6 mm in length, 0.3 mm in width, and 0.2 mm in thickness). The lead wires 246 (see FIGS. 8 and 9) are soldered on electrodes 253 on the opposite sides of the thin film thermistor 251 on the ceramic base plate 252 (see FIG. 13). It is preferable to protect and insulate the thin film thermistor 251 and electrodes 253 by applying a resin to the whole top surface of the sensors.

Figure 14:
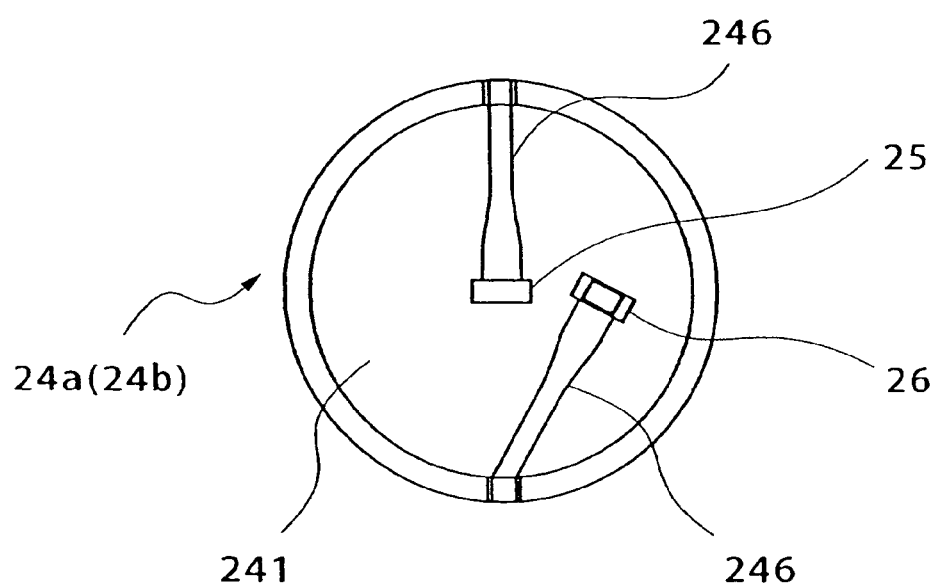
FIG. 14 is a front elevation view of the sensor mirror taken along line XIV-XIV in FIG. 8, illustrating attachment positions of the respective sensors.

As shown in FIG. 14, the first sensor 25 for temperature measurement is disposed on a light collection point above the reflection surface 241 of the sensor mirror 24a (24b). The second sensor 26 for correction of the outside air temperatures is disposed out of the light collection point. The respective sensors 25 and 26 are supported in a front space above the reflection surface 241 in a cantilever manner by the respective lead wires 246. A resin having a high radiation rate for infrared rays (good absorbing and heating) and good dispersion characteristics of heat generated by the infrared rays (for example, black thermoset epoxy resin) is applied onto the first sensor 25. A resin resistant to absorption of infrared rays (for example, two-part hardened epoxy resin) is applied onto the second sensor 26.

In order to set a difference of indication between the first and second sensors 25 and 26, a diameter (for example, 0.05 mm) of the lead wire 246 of the first sensor 25 is set to be smaller than a diameter (for example, 0.08 mm) of the lead wire 246 of the second sensor 26 and heat radiation of the lead wire 246 of the first sensor 25 is set to be lower (to enhance heat retaining property) than that of the lead wire 246 of the second sensor 26.

The first and second sensors 25 and 26 are simultaneously corrected (calibrated) with respect to a temperature. It is necessary to effect correction (calibration) with respect to a temperature under a condition that is not subject to affection of the infrared rays. If the sensors 25 and 26 are corrected under influence of the infrared rays when the sensors 25 and 26 are installed in the sensor mirror 24a (24b), a difference of indication becomes small. Although immersing the sensors in a liquid can carry out the best correcting method, it is not suitable for a mass production. Accordingly, a method for clamping the sensors 25 and 26 between aluminium plates under a temperature-controlled condition is adopted. In order to avoid affection of the infrared rays as much as possible, a white anodized aluminum treatment is applied to a surface of the aluminium plate.

Correction of temperature is carried out with respect to temperatures at two points. The first sensor 25 is left to be in an uncorrected condition while the second sensor 26 is subject to correction with respect to an indication of the first sensor 25 and a temperature. When a difference of indication between the sensors is obtained, one of the indications accords with the other of the indications so as to reduce a calculation error of correction.

EXAMPLE 1

(1) Operation of the measuring device

A body temperature of an object 9 being measured was detected by using the above-mentioned measuring device 5 shown in FIG. 2. Firstly, the probe connector 4 was connected to the measuring device 5 and the temperature plug 7 was connected to the display device 8.

a) Offset correction (calibration)

The switch S1 of the switch group 55 was turned on while the switches S2 and S3 were turned off. AD conversion was carried out to obtain an offset value. An AD input value is known, since the resistors R1 and R2 are known. A difference between the AD converted value and the AD input value indicates an offset error of the differential amplifier 52 and AD converter 51. An input V1 to the AD converter 51 upon offset correction is R2/(R1+R2)×Vref. In the case of a high precision AD converter, an offset error of the AD converter may be negligible, since a self-calibration is carried out every measurement. Accordingly, the offset error is substantially caused in the differential amplifier 52.

b) Measurement of the first sensor 25

The switch S2 was turned on while the switches S1 and S3 were turned off. AD conversion was carried out to obtain an AD converted value. An AD conversion input V2 upon measurement of the first sensor 25 is R3/(R3+RTh1)×Vref. Here, the RTh1 is a resistance value of the first sensor 25 at any temperature.

c) Measurement of the second sensor 26

The switch S3 was turned on while the switches S1 and S2 were turned off. AD conversion was carried out to obtain an AD converted value. An AD conversion input V3 upon measurement of the second sensor 26 is R4/(R4+RTh2)×Vref. Here, the RTh2 is a resistance value of the second sensor 26 at any temperature.

d) Difference of AD converted values between the first and second sensors 25 and 26

The AD converted value of the first sensor 25 was subtracted by an offset value obtained by the offset correction. A target temperature to be measured could be obtained from a relationship among the subtracted value and the difference between the AD converted values of the first and second sensors 25 and 26. Measured temperature data were outputted from a signal processing circuit 53 as digital signals while analogue signals were outputted from the resistance value output circuit 54. The analogue signals serve to enable the sensor (thermistor) input to be connected to a thermometer or a display. A sensor to be used in the present invention is a standard thermistor such as a widely diffused thermistor having resistance temperature characteristics.

The measured temperature data were calculated in an MCU and converted to thermistor resistance values to feed them to the resistance value output circuit 54.

The measuring device 5 is provided to continuously measure temperatures in the object being measured for a long period of time. The steps of operation includes (1) correction, (2) measurement of the first sensor 25, (3) measurement of the second sensor 26, (4) calculation of measured temperatures, and (5) output of temperature data. The above steps of operation are continuously repeated.

(2) Radiation correction (calibration) of a thermistor sensor

The probe 2 was inserted into a blackbody furnace (ear hole-shaped model) set to be at a constant temperature. A difference of indication (infrared rays) and a relative temperature were obtained.

When a relationship between the difference of indication (X) and the relative temperature (Y) is expressed by a graph, the expressed curve well accords with a quaternary nonlinear multinomial. This will well accord with output characteristics of a thermopile. When the relative temperature (Y) is within 1 (one) ° C., the relative temperature (Y) per 0.001° C. in the difference of indication (X) was 0.005 to 0.01° C. (there were individual differences).

An error of a product was set to be ±0.1° C. and an error of indication after correction was set to be ±0.05° C. When an error upon correction is set to be ±0.03° C. and an error of resolution (hardware) is set to be ±0.02° C., it is necessary for a resolution of a thermistor circuit (including a function of the AD conversion) to be at least 0.002° C.

Since a conventional ear-type clinical thermometer is based on measurement at one step for a short period of time, the relative temperature to be measured by the thermopile was needed to be 25° C. or higher. Consequently, the correction values have required a quaternary multinomial or a table that can linearize nonlinear output from the thermopile. However, since the ear-type clinical thermometer according to the present invention is based on continuous measurement after indications have been stable (continuous measurement for a long period of time) and defines a sealed space, a temperature in a sensor itself is very close to a temperature in a target eardrum to be measured and its peripheral tissues. It will be better that the ear-type clinical thermometer according to the present invention can precisely measure the relative temperature of 2° C. at the maximum.

Accordingly, the difference of indication due to infrared rays is a quaternary nonlinear multinomial. In the case where a precision after a stable condition is set to be ±0.1° C., it is possible to correct the difference of indication within a precision of ±0.05° C. by a linear equation to 1° C. in a portion having a low relative temperature or by a quadratic equation to 2° C. at the maximum.

(3) Correction (Calibration) of a temperature drift

The conventional ear-type clinical thermometer based on measurement at a one step (measurement at one step for a short period of time) has required a multinomial or a table as a correction value every environmental temperature, or an amendment equation corresponding to the drift in order to respond to environmental temperatures of 10 to 40° C.

In the ear-type clinical thermometer according to the present invention, the environmental temperature that causes the temperature drift is a temperature in an ear and is within a range of 30 to 40° C. at the maximum. As results of measurement, the temperature drift was ±0.004° C. per environmental temperature 1° C. and an error of indication was within ±0.05° C., even if it does not respond to the drift.

The rise time in which an indication reaches a stable condition (a time in which the finally reached indication after 10 minutes becomes a range within ±0.1° C.) was 5 minutes in a blackbody furnace and 5 to 10 minutes in a human body (there are individual differences) in the case of correction by a linear equation. The rise time was reduced one-half by a quadratic equation.

This will significantly affect a correction time upon production. The further a correcting equation is simplified, the shorter a correcting time becomes (measuring points are reduced) and the fewer an error at a stable condition becomes.

EXAMPLE 2

Indication characteristics of a sensor mirror

Indication characteristics concerning the above two kinds of sensor mirror were evaluated. One of the objects to be evaluated is a first sensor mirror (parallel light collector type sensor mirror) 24a while the other is a second sensor mirror (point-source light collector type sensor mirror) 24b.

Under a good environmental condition at a temperature of about 25° C. and at no breeze, the ear-type clinical thermometer according to the present invention was used for a human body. The first sensor mirror (parallel light collector type sensor mirror) 24a hardly generated individual differences in the difference of body temperatures between ear and the other positions. The second sensor mirror (point-source light collector type sensor mirror) 24b readily generated the individual differences.

The similar experiment was carried out under a condition in which an environmental temperature was lowered and wind blew. An object being measured lowered a temperature on the skin and an indication was lowered in association with the lowered skin temperature. A reduction of indication was caused significantly in the first sensor mirror 24a. It is supposed that an ambient temperature is greatly subject to affection of a skin temperature. This tendency was low in the second sensor mirror 24b and the reduction of indication was not caused at all in a particular object being measured. It has been found from these results that the first sensor mirror 24a can detect a temperature at a deeper position in the ear hole.

Even if an object being measured shows a lower indication in the second sensor mirror 24b rather than in the first sensor mirror 24a (a person who has body features in which a sensor cannot be directed to an eardrum or a distance from an external acoustic meatus inlet to an eardrum is relatively long), the measurement could be carried out on the object being measured without lowering the indication in the second sensor mirror 24b.

In the case where the probe can be optimized or specialized, it has been found that the second sensor mirror 24b is particularly suitable. In the case where individual differences are great and they cannot be absorbed, the first sensor mirror 24a will be preferable.

In general, a structure of an ear hole is different with respect to an age, a sex, a human race, and the like. A distance from an external acoustic meatus inlet from an eardrum in a child is shorter and straighter than that that in an adult. Accordingly, the second sensor mirror 24b will be suitable for children. In the case of adult persons, since the white race has a relatively straight ear hole, the second sensor mirror 24b will be suitable for them. On the other hand, since the Mongoloid race such as the Japanese has a greatly curved ear hole easy to cause individual differences, the first sensor mirror 24a will be suitable for them. It will be possible to respond to the individual differences by providing various intermediate sensor mirrors between the first and second sensor mirrors 24a and 24b.

EXAMPLE 3

Comparison of the present invention's product and the other products

The ear-type clinical thermometer according to the present invention was compared with an existent temperature probe for an eardrum (thermistor). The comparative examples are as follows:

Comparative example 1: a probe (contact type) that brings a small sensor into contact with an eardrum directly;

Comparative example 2: a probe (contact type) in which a buffer material covers a sensor and the sensor contacts an eardrum directly;

Comparative example 3: a probe (non-contact type) in which a buffer material covers a sensor and the sensor does not contact an eardrum; and Comparative example 4: an ear-type clinical thermometer using a thermopile.

In a temperature control during a surgical operation, there is little case where an absolute value of a centralis temperature must be detected clinically. During the surgical operation, it is necessary to monitor not the absolute temperature but a change of temperature. The indication at that time is close to the centralis temperature. Although the comparative example 1 is most suitable if the above fact is taken into consideration, the comparative example 1 gives much damage to an eardrum and it is difficult to take measures against the damage. Consequently, the comparative example 1 has hardly been used. There is still a danger of giving damage to the eardrum in the comparative example 2 and the indication of measurement is a temperature in a cavity.

The comparative example 3 generates a difference of 1 to 2° C. in indication. It has been found from the serial experiments that the comparative example 3 merely measures a temperature in an external acoustic meatus immediately close to the sensor and that it can not only respond to individual differences and environmental temperature but also hardly catches a change of temperature.

The comparative example 4 hardly catches a change of self-temperature and hardly obtains stable indications continuously.

On the other hand, the ear-type clinical thermometer according to the present invention does not contact with the eardrum and does not cause a danger of giving damage to the eardrum in comparison with the comparative examples 1 to 3. The thermometer of the present invention can measure a temperature in the eardrum and its ambient space at the inner position from the eardrum, thereby enabling to pursue a change of the centralis temperature. Also, it is small in size and inexpensive in cost and can be used for an object having various individual differences in comparison with the comparative example 4.

It will be appreciated by those skilled in the art that the ear-type clinical thermometer of the present invention can be applied to an animal as well as a human being.

The entire disclosure of Japanese Patent Application No. 2005-307672 filed on Oct. 21, 2005 including the specification, claims, drawings and summary is incorporated herein by reference in its entirety.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

Thus, having described the invention, what is claimed is:

1. In an ear-type clinical thermometer provided with a probe to be coupled to a measuring device, an ear-type clinical thermometer is characterized in that:

said probe includes a probe body and a temperature measuring section connected to said probe body;

said probe body is formed into a substantially L-shaped cylindrical member, an end of said probe body is coupled to said measuring device through a cable, and the other end of said probe body is connected to said temperature measuring section;

said temperature measuring section includes a flange portion connected to said probe body and a distal end portion extending from the flange portion, and a sensor mirror is fitted in the interior of said distal end portion;

said sensor mirror includes a cylindrical holder having a concave reflection surface in the interior, a coupling shaft extending from the rear side of said cylindrical holder, a first sensor for measurement and a second sensor for correction supported in a front space of said cylindrical holder by lead wires, respectively, and a cover sheathing a front surface of said cylindrical holder;

said lead wires supporting said first and second sensors pass said temperature measuring section and probe body and are electrically connected to said cable, wherein said sensor mirror is a parallel light collector type mirror including a relatively short cylindrical holder having a concave reflection surface therein, a coupling shaft extending from a rear side of said cylindrical holder, first and second sensors supported by individual lead wires-at the front side of said cylindrical holder, and a protection cover sheathing the front side of said cylindrical holder;

wherein said cylindrical holder is provided on the front and rear ends with notches to guide said lead wires from the front side of said temperature measuring section to the rear side of said probe body; and wherein said coupling shaft is provided longitudinally with a plurality of V-shaped grooves.

2. In an ear-type clinical thermometer provided with a probe to be coupled to a measuring device, an ear-type clinical thermometer is characterized in that:

said probe includes a probe body and a temperature measuring section connected to said probe body;

said probe body is formed into a substantially L-shaped cylindrical member, an end of said probe body is coupled to said measuring device through a cable, and the other end of said probe body is connected to said temperature measuring section;

said temperature measuring section includes a flange portion connected to said probe body and a distal end portion extending from the flange portion, and a sensor mirror is fitted in the interior of said distal end portion;

said sensor mirror includes a cylindrical holder having a concave reflection surface in the interior, a coupling shaft extending from the rear side of said cylindrical holder, a first sensor for measurement and a second sensor for correction supported in a front space of said cylindrical holder by lead wires, respectively, and a cover sheathing a front surface of said cylindrical holder;

said lead wires supporting said first and second sensors pass said temperature measuring section and probe body and are electrically connected to said cable, wherein said sensor mirror is a parallel light collector type mirror including a relatively short cylindrical holder having a concave reflection surface therein, a coupling shaft extending from a rear side of said cylindrical holder, first and second sensors supported by individual lead wires-at the front side of said cylindrical holder, and a protection cover sheathing the front side of said cylindrical holder;

wherein each of said sensors includes a thin film thermistor deposited on a ceramic base plate, electrodes attached to the opposite ends of said thin film thermistor, lead wires soldered on said electrodes, and resin materials applied to the whole top surface of said sensors; and wherein said first sensor is applied with a resin material having high radiation and good absorption characteristics of infrared rays and said second sensor is applied with a resin material having characteristics resistant to absorption of infrared rays.

3. In an ear-type clinical thermometer provided with a probe to be coupled to a measuring device, an ear-type clinical thermometer is characterized in that:

said probe includes a probe body and a temperature measuring section connected to said probe body;

said probe body is formed into a substantially L-shaped cylindrical member, an end of said probe body is coupled to said measuring device through a cable, and the other end of said probe body is connected to said temperature measuring section;

said temperature measuring section includes a flange portion connected to said probe body and a distal end portion extending from the flange portion, and a sensor mirror is fitted in the interior of said distal end portion;

said sensor mirror includes a cylindrical holder having a concave reflection surface in the interior, a coupling shaft extending from the rear side of said cylindrical holder, a first sensor for measurement and a second sensor for correction supported in a front space of said cylindrical holder by lead wires, respectively, and a cover sheathing a front surface of said cylindrical holder; and said lead wires supporting said first and second sensors pass said temperature measuring section and probe body and are electrically connected to said cable;

wherein said second sensor mirror is a point-source light collector type sensor mirror including a relatively long cylindrical holder having a concave reflection surface therein, a coupling shaft extending from a rear side of said cylindrical holder, first and second sensors supported by individual lead wires at the front side of said cylindrical holder, and a protection cover sheathing the front side of said cylindrical holder;

wherein said cylindrical holder is provided on the front and rear ends with notches to guide said lead wires from the front side of said temperature measuring section to the rear side of said probe body; and wherein said coupling shaft is provided longitudinally with a plurality of V-shaped grooves.

4. In an ear-type clinical thermometer provided with a probe to be coupled to a measuring device, an ear-type clinical thermometer is characterized in that:

said probe includes a probe body and a temperature measuring section connected to said probe body;

said probe body is formed into a substantially L-shaped cylindrical member, an end of said probe body is coupled to said measuring device through a cable, and the other end of said probe body is connected to said temperature measuring section;

said temperature measuring section includes a flange portion connected to said probe body and a distal end portion extending from the flange portion, and a sensor mirror is fitted in the interior of said distal end portion;

said sensor mirror includes a cylindrical holder having a concave reflection surface in the interior, a coupling shaft extending from the rear side of said cylindrical holder, a first sensor for measurement and a second sensor for correction supported in a front space of said cylindrical holder by lead wires, respectively, and a cover sheathing a front surface of said cylindrical holder; and said lead wires supporting said first and second sensors pass said temperature measuring section and probe body and are electrically connected to said cable;

wherein said second sensor mirror is a point-source light collector type sensor mirror including a relatively long cylindrical holder having a concave reflection surface therein, a coupling shaft extending from a rear side of said cylindrical holder, first and second sensors supported by individual lead wires at the front side of said cylindrical holder, and a protection cover sheathing the front side of said cylindrical holder;

wherein each of said sensors includes a thin film thermistor deposited on a ceramic base plate, electrodes attached to the opposite ends of said thin film thermistor, lead wires soldered on said electrodes, and resin materials applied to the whole top surface of said sensors, and wherein said first sensor is applied with a resin material having high radiation and good absorption characteristics of infrared rays and said second sensor is applied with a resin material having characteristics resistant to absorption of infrared rays.

\* \* \* \* \*